United States Patent Office 2,945,765
Patented July 19, 1960

2,945,765
PROCESS OF FEEDING POULTRY AND COMPOSITION USEFUL THEREIN

John M. Snyder, Cayuga, and Olin A. Rowoth and Clarence E. Lee, Auburn, N.Y., assignors to The Beacon Milling Company, Inc., Cayuga, N.Y., a corporation of New York No Drawing. Filed Mar. 15, 1957, Ser. No. 646,205
15 Claims. (Cl. 99—4)

The present invention relates to egg production in poultry and, more particularly, to novel feeding processes and formulations which have been found to have a striking effect in stimulating and maintaining egg production in poultry.

The primary object of the present invention is to hasten the onset of egg production, and to increase and maintain egg production in poultry by orally administering progesterone, or another compound that possesses the activity characteristically produced by progesterone, as a predeterminedly small part of the diet, viz. in the range of from 0.1 to 25.0 milligrams of progesterone, or an equivalent amount of another compound possessing progesterone activity, per pound of diet.

Other objects of the present invention will in part be obvious hereinafter.

As indicated above, the poultry diet of the present invention incorporates, per pound of diet, from 0.1 to 25.0 milligrams of progesterone or an equivalent quantity of another compound. Conventionally, this equivalent quantity is measured in terms of its progesterone activity, one milligram of pure crystalline progesterone being equal to one international unit. In general, compounds other than progesterone that are productive of results contemplated by the present invention are similar in chemical structure to progesterone itself, which is represented by the following formula:

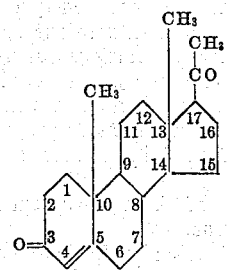

Of these, preferred compounds possessing progesterone activity are cyclopentenophenanthrene derivatives of the type characterized by an extreme hexa-carbon nucleus having a keto-oxygen substituent at position 3 and a double bond between positions 4 and 5. Of these, the most effective compounds are four ring corticoids having 17 nuclear carbon atoms, a substituent carbon atom at position 10, a substituent carbon atom at position 13 and two substituent carbon atoms at position 17. Examples of compounds useful in accordance with the present invention are desoxycorticosterone, pregneninolone, pregnanediol, dehydroandrosterone, acetoxy-pregneninolone and 10-nor-progesterone.

In practicing one form of the present invention, the progesterone or its equivalent is incorporated in an all-mash or an all-pellet diet. Alternatively, the progesterone is incorporated in various dietary combinations such as: mash, pellets and grain; mash and pellets; grain and pellets; or mash and grain. The progesterone is incorporated in any or all components of the diet in such quantities that the overall intake by the fowl of progesterone is at the rate of from 0.1 to 25.0 milligrams per pound of overall diet. For example, it is feasible to incorporate the progesterone in a grit or shell component of the diet or as a distinct entity in an inert carrier such as drinking water.

Specifically, the following mash formulation, incorporating from 0.1 to 25.0 milligrams of progesterone or its equivalent per pound of diet, is particularly effective:

| | Parts by total weight |
|---|---|
| Vegetable proteins | 5–20 |
| Animal proteins | 0–20 |
| Minerals | 2–9 |
| Vitamin concentrates | 0–8 |
| Lipids | 0–10 |
| Cereals | 40–80 |

It has been found that less progesterone than the stated minimum has little or no desired effect and that more progesterone than the stated maximum causes molting.

In the foregoing formulation, for example: Vegetable proteins are soybean oil meal, cotton seed meal, and corn gluten meal; animal proteins are fish meal, meat and bone scrap, and dried milk; minerals are phosphorous providing compounds such as dicalcium phosphate, calcium providing compounds such as calcium carbonate, and ordinary salt; vitamin concentrates provide vitamins A, D, E, K, riboflavin, niacin, choline and pantothenic acid; lipids are fats such as tallow and lard and oils such as cotton-seed oil and soy bean oil; and cereals are corn, oats, wheat, barley, middlings, bran and red dog flour. In addition, to the foregoing formulation are added unidentified factor carriers such as: alfalfa to supply the alfalfa factor; whey to supply the whey factor; meat scrap, fish meal or liver to supply the liver factor; corn distillers solubles; and streptomyces fermentation residue to supply the fermentation factor. In addition to the nutrient factors provided by the foregoing materials, other factors are provided by antibiotics, arsenicals and the like, which are of value directly or indirectly in preventing or treating diseases or in stimulating feed consumption. Preferably, the progesterone or equivalent compound is incorporated into the feed first by premixing in an appropriate proportion with from ¼ to 2% of the final feed, and then uniformly distributing the premix throughout the final feed.

The following non-limiting examples further illustrate the present invention:

*Example I*

Three groups of S.C. White Leghorn pullets, starting at 143 days of age, were fed for 84 days on the following all-mash dietary regimens.

Group 1, the control group, received the following all mash formulation:

| | Parts by total weight |
|---|---|
| Soybean oil meal (50% protein) | 13¼ |
| Alfalfa leaf meal | 2 |
| Wheat standard middlings | 11½ |
| Wheat red dog | 2½ |
| Meat, bone scrap and poultry by-product meal mixture | 2½ |
| Fish meal | 1 |
| Dicalcium phosphate | 1¾ |
| Fortified mixture of dried whey, grain fermentation solubles and dried extracted streptomyces fermentation residue | 2 |
| Salt | ½ |
| Calcium carbonate | 2¾ |
| Beemico | ½ |
| Corn meal | 44¾ |
| Pulverized oats | 7½ |
| Ground barley | 5 |
| Animal fat with antioxidants, viz. butylated hydroxyanisole, citric acid and propylene glycol | 2½ |

To this was added per ton, 3 lbs. of cod liver oil with added vitamin A and D concentrates, viz. 1000 units of vitamin A and 600 I.C.U. of vitamin $D_3$ per gram of cod liver oil.

Group 2 received the same diet as group 1 except that 5 milligrams of progesterone was added per pound of feed, and group 3 received the same diet as group 1 except that 10 milligrams of progesterone was added per pound of feed.

During the 84 day experimental period the group 1 birds laid an average of 52¼ eggs per bird, the group 2 birds laid an average of 56½ eggs per bird and the group 3 birds laid an average of 57½ eggs per bird.

EXAMPLE II

Three groups of production strain hybrid pullets were subjected to the following regimens. Group 1, from 140 to 182 days of age, was fed Formulation A and, from 182 days of age thereafter, was fed Formulation B, as follows:

*Formulation A*

| | Parts by total weight |
|---|---|
| Soybean oil meal | 8¾ |
| Alfalfa leaf meal | 3 |
| Wheat bran | 7½ |
| Wheat standard middlings | 10 |
| Meat and bone scrap and poultry by-product meal mixture | 2½ |
| Fish meal | 1 |
| Dicalcium phosphate | ½ |
| Fortified mixture of dried whey, grain fermentation solubles and dried extracted streptomyces fermentation residue | 2 |
| Salt | ½ |
| Calcium carbonate | 1¾ |
| Beemico | ¼ |
| Corn meal | 41¼ |
| Pulverized oats | 10 |
| Ground barley | 10 |
| Vitamin and antibiotic (penicillin) premix | ½ |
| Animal fat with antioxidants, viz. butylated hydroxyanisole, citric acid and propylene glycol | ½ |

To this was added per ton, 3 lbs. of cod liver oil with added vitamin A and D concentrates, viz. 1000 units of vitamin A and 600 I.C.U. of vitamin $D_3$ per gram of cod liver oil.

*Formulation B*

| | Parts by total weight |
|---|---|
| Soybean oil meal (50% protein) | 7½ |
| Alfalfa leaf meal | 2 |
| Red dog | 1 |
| Wheat standard middlings | 13 |
| Meat and bone scrap and poultry by-product meal mixture | 7½ |
| Fish meal | 2 |
| Dicalcium phosphate | ¾ |
| Fortified mixture of dried whey and grain fermentation solubles and dried extracted streptomyces fermentation residue | 1 |
| Salt | ½ |
| Calcium carbonate | 2½ |
| Beemico | ½ |
| Corn meal | 53¼ |
| Pulverized oats | 2½ |
| Ground barley | 5 |
| Animal fat with antioxidants, viz. butylated hydroxyanisole citric acid and propylene glycol | 1 |

To this was added per ton, 3 lbs. of cod liver oil with added vitamin A and D concentrates, viz. 1000 units of vitamin A and 600 I.C.U. of vitamin $D_3$ per gram of cod liver oil.

Group 2 was fed the same diet as group 1 except that 5 milligrams of progesterone per pound of feed was incorporated into the Formulation A when the group 2 birds were 140 days of age, and 5 milligrams of progesterone per pound of feed was incorporated into Formulation B when the group 2 birds were 182 days of age. The group 3 birds were fed the same diet as the group 1 birds except that 5 milligrams of progesterone per pound of feed was incorporated into Formulation B when the group 3 birds were 182 days of age.

When the birds were 217 days of age, the weekly rate of egg production was 85% for the group 1 birds, 88½% for the group 2 birds and 91½% for the group 3 birds.

In practicing the present invention, preferably feed incorporating the stated proportion of progesterone or its equivalent is provided continuously over a predetermined period of life span measured in terms of weeks or months. However, it is to be understood that in the foregoing process broadly, the stated proportion of progesterone or its equivalent should be considered in relation to an overall diet for the predetermined period of life span rather than merely for a specific dietary formulation. Thus, in general over a period of several weeks, a typical individual fowl, consuming on the average from .2 to .3 pound of diet per day, should receive on the average from .02 to 7.5 milligrams of progesterone or its equivalent per day. In other words, it would be possible, to vary the diet from day to day so as to incorporate at any given time a quantity of progesterone or its equivalent falling outside of the stated range, although the average quantity of progesterone or its equivalent, measured over several days, would fall within the stated range.

Since certain changes may be made in the above apparatus without departing from the scope of the invention herein involved, it is intended that all matter contained in the above description shall be interpreted in an illustrative and not in a limiting sense.

What is claimed is:

1. A method of stimulating egg production in poultry, said method comprising administering, continuously, as a part of the diet of said poultry throughout a predetermined period of lifespan, said period being at least measured in terms of weeks, a predetermined quantity per pound of diet of a cyclopentenophenanthrene derivative, of which the extreme hexacarbon nucleus has a keto-oxygen substituent at position 3 and a double bond between positions 4 and 5, said predetermined quantity possessing from 0.1 to 25.0 international units of progesterone activity.

2. The method of claim 1 wherein said compound is progesterone.

3. The method of claim 1 wherein said compound is desoxycorticosterone.

4. The method of claim 1 wherein said compound is pregneninolone.

5. The method of claim 1 wherein said compound is pregnanediol.

6. The method of claim 1 wherein said compound is 10-nor-progesterone.

7. A method of stimulating egg production in poultry, said method comprising administering continuously, as a part of the diet of said poultry throughout a predetermined period of lifespan, said period being at least measured in terms of weeks, a predetermined quantity per pound of diet of a cyclopentenophenanthrene derivative, of which the extreme hexacarbon nucleus has a keto-oxygen substituent at position 3 and a double bond between positions 4 and 5, said predetermined quantity possessing from 0.1 to 25.0 international units of progesterone activity, said diet comprising as a feed by total weight: vegetable proteins 5–20 parts, animal proteins 0–20 parts, minerals 2–9 parts, vitamins 0–8 parts, lipids 1–10 parts, and cereals 40–80 parts.

8. A method of stimulating egg production in poultry, said method comprising administering continuously from .2 to .3 pound of diet per day per unit throughout a period of several weeks, said diet including on the average from .02 to 7.5 milligrams of progesterone, said diet comprising by total weight: vegetable proteins 5 to 20 parts, animal proteins 0 to 20 parts, minerals 2 to 9 parts, vitamins 0 to 8 parts, lipids 1 to 10 parts and cereals 40 to 80 parts.

9. A poultry feed formulation containing hormone and nutrient materials that coact to stimulate egg production in poultry, said formulation comprising, in a predetermined quantity per pound of said formulation, a cyclopentenophenanthrene derivative, the extreme hexacarbon nucleus of which has a keto-oxygen substituent at position 3 and a double bond between positions 4 and 5, said predetermined quantity possessing from 0.1 to 25.0 international units of progesterone activity.

10. The formulation of claim 9 wherein said compound is progesterone.

11. The formulation of claim 9 wherein said compound is desoxycorticosterone.

12. The formulation of claim 9 wherein said compound is pregneninolone.

13. The formulation of claim 9 wherein said compound is pregnanediol.

14. The formulation of claim 9 wherein said compound is 10-nor-progesterone.

15. A poultry feed formulation containing hormone and nutrient materials that coact to stimulate egg production in poultry, said formulation comprising as a hormone from .02 to 7.5 milligrams of progesterone per .2 to .3 pound of diet, said diet comprising by total weight: vegetable proteins 5 to 20 parts, animal proteins 0 to 20 parts, mineral 2 to 9 parts, vitamins 0 to 8 parts, lipids 1 to 10 parts and cereals 40 to 80 parts.

References Cited in the file of this patent

UNITED STATES PATENTS

| 2,589,898 | Turner | Mar. 18, 1952 |

FOREIGN PATENTS

| 636,908 | Great Britain | May 10, 1950 |
| 506,216 | Belgium | Oct. 31, 1951 |

OTHER REFERENCES

Adams: Poultry Science, 35 (1956), pp. 323–326.